(12) United States Patent
Murphy et al.

(10) Patent No.: US 9,894,523 B2
(45) Date of Patent: Feb. 13, 2018

(54) WIRELESS DEVICE CUSTOMIZATION RESOURCES

(71) Applicant: SIERRA WIRELESS, INC., Richmond (CA)

(72) Inventors: Kelly Mathew Murphy, Vancouver (CA); Jen T'ai Chitty, Surrey (CA); Alex Jiang, Surrey (CA); Zeljko Blazek, Burnaby (CA); Andrew Hasley Watson Mitchell, North Vancouver (CA)

(73) Assignee: Sierra Wireless, Inc., Richmond, British Columbia ( * ) Notice: Subject to any disclaimer, the term of this patent is extended or adjusted under 35 U.S.C. 154(b) by 0 days.

(21) Appl. No.: 14/630,532

(22) Filed: Feb. 24, 2015

(65) Prior Publication Data

US 2015/0245215 A1 Aug. 27, 2015

Related U.S. Application Data

(60) Provisional application No. 61/943,911, filed on Feb. 24, 2014.

(51) Int. Cl.
*G06F 21/53* (2013.01)
*H04W 12/08* (2009.01)
*H04W 4/00* (2009.01)

(52) U.S. Cl.
CPC ........... *H04W 12/08* (2013.01); *G06F 21/53* (2013.01); *H04W 4/005* (2013.01); *G06F 2221/03* (2013.01)

(58) Field of Classification Search
CPC ......... G06F 21/62; G06F 21/335; H04L 63/10

USPC ................ 726/4, 16; 713/100; 709/224, 217
See application file for complete search history.

(56) References Cited

U.S. PATENT DOCUMENTS

| | | | |
|---|---|---|---|
| 5,634,124 A * | 5/1997 | Khoyi | G06F 8/76 |
| 6,625,603 B1 * | 9/2003 | Garg | G06F 9/468 |
| | | | 707/758 |
| 7,293,021 B1 | 11/2007 | Rafnsson | |
| 7,577,834 B1 * | 8/2009 | Traversat | G06F 9/547 |
| | | | 713/156 |

(Continued)

FOREIGN PATENT DOCUMENTS

WO   WO-2015/123785 A1   8/2015

OTHER PUBLICATIONS

International Search Report and Written Opinion dated May 14, 2015, which issued in International Application No. PCT/CA2015/050138.

(Continued)

*Primary Examiner* — Trang Doan
(74) *Attorney, Agent, or Firm* — McDermott Will & Emery LLP

(57) ABSTRACT

The present invention provides methods, systems and computer program products for facilitating loading, configuration and interaction of modular applications and/or modular components of an application on wireless devices such as M2M terminals. Modular elements may be connected to each other based on a system of permissions which determines which elements are permitted to access given services offered by other elements. Once connected, modular elements may communicate directly via a standardized interface.

21 Claims, 5 Drawing Sheets

(56) References Cited

U.S. PATENT DOCUMENTS

| | | | | |
|---|---|---|---|---|
| 8,082,491 B1* | 12/2011 | Abdelaziz | ............... | G06F 9/465 709/201 |
| 8,200,591 B2* | 6/2012 | Govindaraj | ........ | G05B 19/0421 700/28 |
| 8,522,312 B2* | 8/2013 | Huber | ................ | G06Q 20/1235 726/3 |
| 8,539,072 B1* | 9/2013 | Harrison | ................. | H04L 63/10 709/224 |
| 8,819,219 B2* | 8/2014 | Vandwalle | ............... | H04L 67/16 709/224 |
| 8,893,114 B1* | 11/2014 | Cooley | ..................... | G06F 8/66 717/168 |
| 2004/0019582 A1* | 1/2004 | Brown | ............... | G06F 17/30392 |
| 2007/0276728 A1* | 11/2007 | Bala | ..................... | G06F 21/121 705/14.54 |
| 2009/0077032 A1* | 3/2009 | Shin | ................... | G06F 17/30864 |
| 2011/0179483 A1 | 7/2011 | Paterson et al. | | |
| 2011/0271270 A1* | 11/2011 | Bowen | ...................... | G06F 8/67 717/171 |
| 2012/0005025 A1* | 1/2012 | Aaltonen | ............... | G06Q 30/02 705/14.64 |
| 2012/0023496 A1 | 1/2012 | Kwak et al. | | |
| 2012/0079368 A1* | 3/2012 | Abdelaziz | ............... | G06F 9/465 715/234 |
| 2013/0246141 A1* | 9/2013 | Liberty | .............. | G06Q 30/0208 705/14.17 |
| 2013/0262392 A1* | 10/2013 | Vibhor | .............. | G06F 17/30557 707/654 |
| 2013/0268357 A1* | 10/2013 | Heath | ..................... | H04L 63/00 705/14.53 |
| 2013/0340050 A1* | 12/2013 | Harrison | ................. | H04L 63/10 726/4 |
| 2014/0007222 A1* | 1/2014 | Qureshi | .................. | G06F 21/10 726/16 |
| 2014/0018048 A1 | 1/2014 | Anand et al. | | |
| 2014/0122702 A1* | 5/2014 | Jung | ................... | H04L 43/0876 709/224 |
| 2014/0173700 A1* | 6/2014 | Awan | ..................... | H04L 63/107 726/4 |
| 2014/0330952 A1* | 11/2014 | Starsinic | ............... | H04W 4/001 709/223 |
| 2014/0359061 A1* | 12/2014 | Foti | ......................... | H04L 67/10 709/217 |
| 2015/0031335 A1* | 1/2015 | Dong | ..................... | H04L 63/04 455/411 |
| 2015/0143472 A1* | 5/2015 | Kim | ..................... | H04W 48/02 726/4 |
| 2015/0195671 A1* | 7/2015 | Seed | ..................... | H04L 67/16 455/434 |
| 2016/0191507 A1* | 6/2016 | Bao | ..................... | H04L 63/0853 455/411 |

OTHER PUBLICATIONS

Extended European Search Report from European Patent Application No. 15752315.0, dated Jul. 25, 2017, 7 pages.

* cited by examiner

WIRELESS DEVICE CUSTOMIZATION RESOURCES

CROSS-REFERENCE TO RELATED APPLICATIONS

This application claims the benefit and priority of U.S. Provisional Application 61/943,911, filed Feb. 24, 2014. The foregoing application is incorporated by reference herein in its entirety.

FIELD OF THE INVENTION

The present invention pertains in general to electronic computing devices capable of wireless communication, and in particular to resources for configuring or customizing such devices.

BACKGROUND

There are currently a large number of software applications or "apps" available for installation on consumer wireless devices such as smartphones and tablets. Such apps are typically written and operate independently of each other, and their interaction is limited. End users do not build or change applications or interconnect them in ways not intended by their original designers. Even when interaction between apps is desired, this typically requires extensive user interaction.

Machine-to-Machine (M2M) wireless devices, such as wireless meters, sensors, trackers, telematics devices, and the like, typically include an autonomous or semi-autonomous wireless device which is adapted to a certain purpose through software or firmware. These devices can execute operations locally and also communicate with other devices and/or servers over a communication medium such as a cellular communication network. The cellular communication network may be a Long Term Evolution (LTE) network as specified by the 3$^{rd}$ Generation Partnership Project™ (3GPP) organization. Since M2M devices are often dedicated to a specific task, they are typically provided with custom software and/or firmware. Such customization can require extensive and expensive programming effort. For some use cases, this can also be true for other wireless devices, such as consumer devices.

Therefore there is a need for wireless device customization resources that are not subject to one or more limitations of the prior art, for example in order to ease the time, effort and/or expense required for device customization.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and system for providing wireless device customization resources. In accordance with an aspect of the present invention, there is provided a method for facilitating operation of a wireless terminal device having plural code components installed thereon, the method comprising: providing, by the wireless device, a directory for use by the code components to advertise services offered thereby and to request access to said advertised services; upon receiving a request for access by a first code component to a first advertised service of said advertised services, determining, by the wireless device, whether said first code component is granted a permission to access said first advertised service; and upon determining that said first code component is granted said permission, directly communicatively coupling, by the wireless device, the first code component to a second code component offering said first advertised service, wherein the first and second code components utilize a standardized communication interface for facilitating said direct communicative coupling.

In accordance with another aspect of the present invention, there is provided a wireless terminal device, comprising: a memory having an operating system and plural code components installed thereon; a service directory installed in said memory for use by the code components to advertise services offered thereby and to request access to said advertised services; a supervisory module installed in said memory and configured, upon receiving a request for access by a first code component to a first advertised service of said advertised services, to determine whether said first code component is granted a permission to access said first advertised service; and the supervisory module further configured, upon determining that said first code component is granted said permission, to directly communicatively couple the first code component to a second code component offering said first advertised service, wherein the first and second code components utilize a standardized communication interface for facilitating said direct communicative coupling.

In accordance with another aspect of the present invention, there is provided a computer program product comprising a non-transitory computer readable medium having stored thereon statements and instructions for execution by a computer for performing operations for facilitating operation of a wireless terminal device having plural code components installed thereon, the operations comprising: providing, by the wireless device, a directory for use by the code components to advertise services offered thereby and to request access to said advertised services; upon receiving a request for access by a first code component to a first advertised service of said advertised services, determining, by the wireless device, whether said first code component is granted a permission to access said first advertised service; and upon determining that said first code component is granted said permission, directly communicatively coupling, by the wireless device, the first code component to a second code component offering said first advertised service, wherein the first and second code components utilize a standardized communication interface for facilitating said direct communicative coupling.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
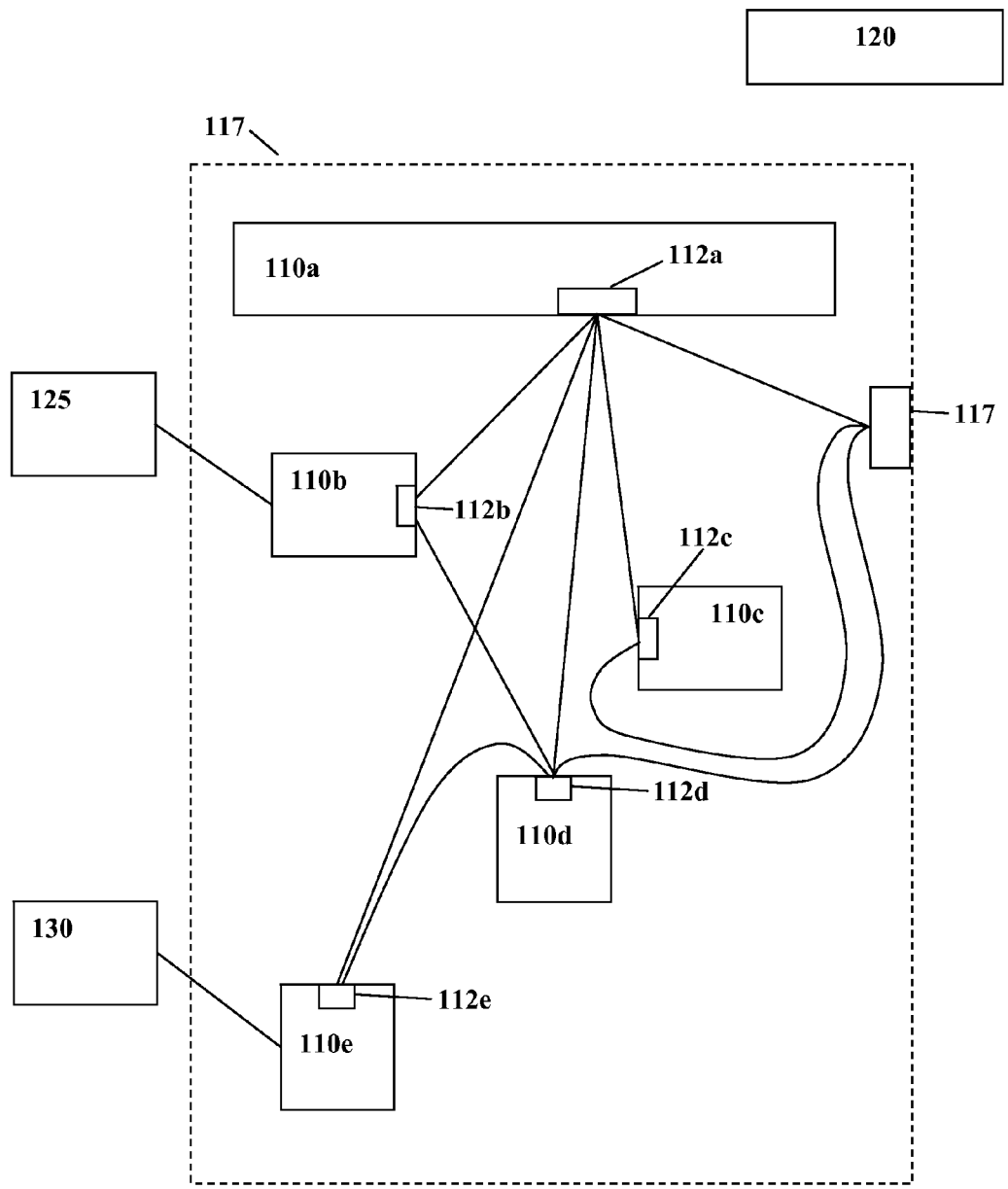
FIG. 1 illustrates a collection of modular components of an application, in accordance with embodiments of the invention.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Embodiments of the present invention provide for methods, systems, and computer program products related to configuration of wireless devices, such as but not necessarily limited to M2M wireless devices. To this end, various embodiments relate to modular components such as computer program components, which interact to cause the wireless device to function in a desired manner. More particularly, various embodiments relate to facilitating the loading, configuration, operation and/or interaction of such modular components.

In various embodiments of the present invention, modular components are directly or indirectly operatively coupled using a particular approach, which can be differentiated from known approaches for interconnecting different components, such as calling various functions from within a main program, or writing specific "glue" software for facilitating specific interoperation of separate pieces of software. Such glue software may for example act as an intermediary for passing all messages between the separate pieces of software. Embodiments of the present invention may allow for connections to be made between different modular components without the need for specialized connecting software to continually mediate the connection. Furthermore, some embodiments allow for various different modular components to be selected and added to the whole, and further manage the interaction between these modular components. This may provide for a customizable functionality of the wireless device, the customizable functionality arising from interaction between various component functions which are integrated together and closely interacting with one another.

Various embodiments of the present invention are configured to ease the customization of M2M wireless device terminals for a given purpose, for example in order to avoid extensive individual design and programming. In some embodiments, a M2M terminal which is general purpose or general purpose within a particular field of application is customized by the installation of a customized set of interactive applications, at least some of which are modular and ready-made for performing certain tasks. In some embodiments, a M2M terminal or set of terminals may be customized by the installation of at least one application which comprises components which are modular and ready-made for performing certain tasks. In some embodiments, a M2M terminal may be customized by the installation of a customized set of interacting applications, at least some of which are modular and ready-made for performing certain tasks, and wherein at least one of the interacting applications comprises components which are modular and ready-made for performing certain tasks. Tasks may include computing tasks, input acquisition tasks, output signalling tasks, managing execution of other applications, or the like, or a combination thereof.

In various embodiments, applications are installed on a flash file system of the wireless device terminal. The application configuration settings, including service access permissions and sandbox runtime limitations (e.g., number of processes, Temporary File Storage Facility (TMPFS) size) settings, are then written to the configuration database. A supervisory module is configured to interact with the configuration database to identify the configuration information for an application and to launch the application accordingly.

In some embodiments, applications may be configured as standard applications operable in a given operating system environment, such as but not limited to Linux™, iOS™, Android™, and the like.

In some embodiments, plural applications, for example on a given terminal, may have at least one component in common. In this case, one version of the component held in common may be stored in memory and used by both applications. A service directory routine may be provided to manage access to the common component, for example by queueing requests to use the component, storing and retrieving different states of the component as needed, and the like.

For convenience, component applications and/or components of an application are collectively referred to herein as "components." However, it is contemplated that different embodiments of the invention may comprise solely components which are applications, solely components which are components of an application, or a combination of components which are applications with components which are components of an application. Each of the components may perform certain operations in furtherance of a desired set of tasks, and the components may operate together in order to execute the desired set of tasks. Interaction of components may include message passing or other types of data sharing, calling of a second component by a first component, returning data from the second component to the first component after execution of operations in response to being called, and the like.

Components may function, for example, to provide one or more of the following services. Providing geographic location, obtaining and providing a reading from an electronic device coupled to the wireless terminal, such as a utility meter, temperature gauge, sensor, camera, or the like, filtering a signal, processing a signal, providing an output based on logical operations performed on inputs obtained from hardware or other components, monitoring for a trigger event and performing a predetermined operation in response to the trigger event, maintaining a timer, or the like. Components may additionally or alternatively provide more advanced or specific functionality, such as interfacing with a particular piece of hardware and/or operating as a device driver, interfacing with a particular class of other components, performing a particular type of computation, wireless communication, network access control, power management, memory management, search functionality, or the like.

In some embodiments, interacting components, such as applications, may be organized in a client/server structure. Each pair or set of interacting components may include a client component and a server component. Further, a component may act as a client with respect to interactions with some components and as a server with respect to interactions with other components, thereby making the client/server structure hierarchical or mixed. It is further contemplated that a client/server loop may be established, for example in which a first application acts as a client to a second application, the second application acts as a client to a third application, and the third application acts as a client to the first application. Various embodiments of the present invention may be configured to allow or avoid such loops. Roles of client and server applications may follow from the known definitions of clients and servers. For example, a server may provide a resource or service and may share resources with clients, while a client may request and receive such a resource or service and may not share resources. Clients may initiate requests for service while servers may respond to incoming requests.

In some embodiments, the device may be configured to provide a service directory which is configured to facilitate component interaction. Components may advertise system services and/or capabilities via the directory and other components may consult the directory to find a desired service to use. The directory may specify means, for example commands interpreted by a microprocessor of the device when running a particular service directory application, by which a service of one component may be invoked by another. Services which can be provided by installed components, such as components which are applications or components which form parts of an application, may be advertised in the directory by numerical code, keyword, or the like. The directory may correspond to a registry which lists available services, and installation of a component may trigger registration of the component's services in the directory or registry.

In some embodiments, a configuration database is provided. The configuration database may list all of the applications that are installed on the device's file system, e.g. flash file system. The configuration database may also contain the applications' configuration settings including the service access permissions and sandbox runtime limitations (e.g. number of processes, TMPFS size), and the like. The service directory may manage access to these services, for example based on permissions, compatibility, and the like. The configuration database may contain an Access Control List (ACL) related to various identifiers, which may be User IDs (UIDs) such as Linux UIDs. In various embodiments, various components, such as each modular component application, may each be assigned a UID, which can be used to uniquely identify the component. The service directory may be configured to access the ACL of all UIDs and to connect the components based on ACL permissions.

Alternatively, in some embodiments, instead of using the application's user ID (UID) to identify the application for the purposes of enforcing access permissions, a unique mandatory access control (MAC) label may be assigned to each application, such that all processes running inside an application include the MAC label of said application. The Service Directory may be configured to obtain the client's process ID (PID) from the operating system (OS) and ask the OS for the MAC label associated with that PID. This configuration allows the Service Directory to authenticate the application when the application is permitted to change its UID but not its MAC label.

In various embodiments, interaction of modular components may be facilitated by the use of standardized interfaces. For example, each component may be configured to interface with other components in a standardized manner, and each component may be designed so that it is broadly or universally applicable. The standardized interface may define a set of messages that the component is responsive to, as well as a standardized manner of sending messages or responding to messages which is recognized by other components. The interface of each modular component is designed in an open manner, such that the component is configured to respond in a predictable manner when presented with messages belonging to a standardized set, and also such that it will use messages from the standardized set when sending outgoing communications for interacting with other modular components.

Standardized interfaces may be designed with an emphasis on ease of use. For example, permissions and interactions between components may be managed by a given management tool. In some embodiments, applications may operate inside their own sandboxes. Sandboxes may be used to isolate components, for example by defining what resources, interactions and/or operations the applications are permitted to make use of. In some but not necessarily all embodiments, sandboxes may further be nested, so that components and their sandboxes may be included within other applications and their respective sandboxes.

In some embodiments, each sandbox corresponds to a set of resources which is substantially isolated and dedicated for use by the application or applications operating therein. The sandbox may comprise a virtual computing environment, a dedicated real or virtual file system, a virtual memory space, or the like, or a combination thereof.

In some embodiments, components may be in various forms such as source code or binaries. Different interacting components may be provided in the same form or different forms.

The standardized interface may be capable of handling a variety of message types, and also may be defined so that it is readily expandable to future uses. In some embodiments, the standardized interface may be both human readable and machine readable. In some embodiments, messages may be passed directly between components. In some embodiments, messages may be mediated by a mediator application which acts to receive and store messages from components, for example in a queue, and forward messages upon being queried by components or upon satisfaction of another predetermined condition.

It is contemplated that, since components interact principally through their standardized interfaces, different components may be written in different languages, provided that they are each capable of transmitting and receiving digital messages that comply with the interface standard.

In some embodiments, configuration for collections of components may be offered using a variety of methods such as drag and drop graphical tools, direct communication, client-server structures, data streams, and the like.

In some embodiments, component-to-component interfacing follows an open architecture, in which potential interactions are defined broadly and with room for future expansion. In some embodiments, permissions are applied to interactions between components. In some embodiments, permissions are applied to security, billing, or both. Thus, although definition of interactions may be broad for design purposes, security and/or predictability may be provided via use of permissions regarding what operations are permissible to given components.

In various embodiments, as mentioned above, operation of components and interaction between components may be automatic, without requiring user input on an ongoing basis. For example, operations may be performed in response to an electronic stimulus such as a sensor reading, a timer timeout, or the like, or a combination of stimuli. Automatic operation of components may be desirable particularly when the wireless terminal is a M2M terminal configured for unattended, autonomous operation. For example, an unattended wireless terminal may be configured to perform a certain set of operations for performing a task such as acquiring sensor readings or actuating certain physical equipment in a predetermined manner, as well as connecting to a remote server periodically in order to transfer information to or from the server, and perform periodic diagnostic and/or maintenance routines automatically.

In some embodiments, a system of selective revenue collection for components and/or applications may be provided. Owners of components may additionally or alternatively license these components. Various approaches to revenue collection, such as pay-for-use, pay-for-download, or the like, may be used.

In some embodiments, a system of selective permissions may be provided for the use and interaction of components, such as applications. For example, applications may, by default, have little or no permission to interact with any other application or resource, and tight limits may be enforced on how much RAM they may use, what priority they can run at, and the like. The system of selective permissions may allow for changes from such a default on a per-component or per-group basis. Personnel such as systems engineers in charge of deployment of applications to devices may approve access to services offered by other applications or device drivers, and may also approve the offering of services to other applications.

In some embodiments, an application may comprise a description of components used, how the components interface with each other and how the components interface with external hardware interfaces. As a further example, if a geo-fencing application requires location information from a GPS device and access to a modem, such an application may describe how to interface with those hardware parts. Furthermore, an application may potentially be used as a component in another higher level application if that higher level application has permission to use it.

In various embodiments, components may be communicated to target wireless terminals via wireless link. Over-the-air programming of wireless terminals may thereby be provided. Predefined batches of components may be downloaded to terminals automatically or in response to an operator command or other authorization. Batches of components may be defined and passed to an installation routine, which installs the components in the batch in a predetermined manner. This program may also configure the components for a predetermined manner of interaction with each other, build component applications from modular components of applications, and the like.

In various embodiments, a supervisory module may be provided. The supervisory module may be configured to perform various operations, such as downloading and installing components, starting and stopping applications, resetting the wireless device operating environment when necessary and facilitating error recovery or recovery from system crashes. The supervisory module may perform system maintenance, upgrading of components, and the like. In some embodiments, the supervisory module may be configured to monitor for wireless device errors and initiate recovery from such errors by restarting the wireless device and subsequently restarting applications operating thereon.

In some embodiments, either the supervisory module or the operating system may be configured to determine whether other applications will be affected by a recovery operation, and, if so, to notify these other applications. A message may be passed to the applications for example causing them to suspend operation or message passing until the recovery operation is completed. In some embodiments, the supervisory module may be configured to detect compatibility problems and respond by halting operations. In some embodiments, the supervisory module may be configured to check for integrity of upgrades.

Various embodiments of the present invention provide for revision version management of components, for example to ensure that installed components are compatible and/or that integrity is maintained when components are upgraded to newer versions. In some embodiments, this is facilitated by the following process: For each interacting component (e.g. each application), a hash value is generated from the associated Application Programming Interface (API) file. The hash values are compared to determine whether the components were built using the same API version, as denoted by the components having equal hash values. Some or all components may be required to have the same hash in order to be guaranteed to be compatible. For example, client and server applications may be required to have the same hash. This may provide a relatively secure method of version management and is an alternative to simply using version numbers, which may be prone to error or inaccuracy.

In various embodiments, generating the hash value from the API file may be performed automatically for example during compiling of the component software, saving of the component software source code, or the like, or a combination thereof In some embodiments, the service directory is configured to identify the communications interface protocol, for example including the version of that protocol, using cryptographic hashes. This may be used to facilitate preventing accidental usage of an incorrect protocol or protocol version.

In some embodiments, the service directory includes, for a component listed therein, an indication of what communication protocol and/or communication protocol version is usable for interaction with that component. The communication protocol may specify the manner and format of messages to be passed between components to facilitate their interaction. That is, the communication protocol may be the protocol of the standardized communication interface for facilitating direct communicative coupling with the given component. The indication of the communication protocol may derived by generating a hash value from the API file used for specifying the communication functionality of the component. In various embodiments, the hash value may be generated based on all of the API or based on a portion of the API, the portion corresponding to a part of the API which changes from version to version, thereby facilitating providing different hash values for different API versions.

In some embodiments, a library or catalog of available components, such as applications or components of applications, or both, may be provided and maintained. Components may be developed independently and shared with others. Each component may be publicly available or available and/or advertised by permission only. Sharing of private components may be between a list of developers or organizations associated with that component, for example. Each entry in the catalog may comprise a link to a component, a description of how the component operates, and a specification of the component's behaviours, requirements, dependencies, interface capabilities, and the like.

It is recognized that, although a particular emphasis has been placed herein on M2M devices, aspects of the present invention may also be applied to other types of wireless devices, such as smartphones or tablets. For example, the present invention may be used to customize consumer wireless devices by installing a set of interactive, modular applications and/or an application made of a set of interactive, modular components. Furthermore, it is appreciated that embodiments of the present invention may be applied to various automation systems, including but not limited to smartphones, home/building automation, industrial automation, SCADA, automotive/transportation systems, environmental monitoring and control, remote sensing, robotics, personal computing, and the like.

Furthermore, although in various embodiments all interacting components of a particular application or set of applications are co-located on the same wireless device, it is contemplated that different interacting components may be installed on different wireless devices. Interaction in this case may be facilitated via wired or wireless communication between devices. This may require different components to communicate via a network socket, for example, which may be established and/or maintained by a specific component, such as a supervisory module or one of the interacting components directly. In some embodiments, one interacting component may be a client component and another interacting component may be a server component operating on a different terminal device or on a server.

In some embodiments, the present invention provides for tools, such as computer programs, for use by developers or other personnel in implementing the features as described herein, for example when developing modular components such as applications. The personnel may define an Application Programming Interface (API) and the provided tools may be configured, in response, to generate code for interprocess communication. This may reduce or even eliminate the need for the personnel to deal with individual messages between applications. Rather, the provided tools may be configured to perform the parsing of the required communications and provide the interfaces that can be understood by other components.

In various embodiments, interprocess communication (IPC) may be provided for facilitating interaction between components, such as applications and/or components of applications. Various components may optionally be defined as client and server components, and messages may be passed between components to facilitate interaction therebetween. The messages may be in a standardized format and/or selected from a list of standard messages for use with the standardized interface of the components. For example, a client may request data from a server and the server may respond to the client by passing the requested data in a message. Message queues, shared memory space, socket-to-socket communication, pipes, named pipes, or the like may be used to facilitate the message passing. A particular embodiment of the present invention facilitates IPC by exchanging data between components via dedicated file descriptors.

For example, in one embodiment, an Application Programming Interface may provide a "Start Application (Application name)" file that contains the supporting .h and .c files required and which can have added the server and client code function calls.

As another example, the personnel, e.g. programmer, may define their API using a language-independent function-call API definition language. This may be stored in a .api file (e.g., myAPI.api).

When writing a component that will use a language-independent API, the personnel, e.g. developer, may add a line to their Component.cdef file, which tells the build system that their component will import an interface that is defined by that .api file. Subsequently, when an application containing that component is built, the client-side IPC code may be generated (in the appropriate programming language). This generated code may then allow the client to call functions inside the server, even though the server could be running in a different process. This may be achieved by packaging the function call parameters into a message and sending it over a socket to the server process. The client may then wait for the response message, unpack any return value or output parameters from the response message and return these back to the client. To the client, this may be treated as a regular function call in the language which the client component is written in. To the server, this may be treated as a regular function call in the language which the server component is written in.

In some embodiments, when writing a component that will act as the "server" for an API such as described above, a line (e.g., "foo=myAPI.api") may be added to the Component.cdef file, which tells the build system that the component will export an interface that is defined by that .api file. In response, when an application containing that component is built, the server-side IPC code will be generated. Furthermore, this code may be generated in the programming language that the server component is written in. This generated code may provide the component with a function to advertise the API with the service directory.

Additionally, the generated server-side code may also be configured to accept messages from clients. Additionally, the generated server-side code may also be configured to extract the API function call parameters from those messages. Additionally, the generated server-side code may also be configured to call the appropriate functions within the server component that implements those API functions. Additionally, the generated server-side code may also be configured to package any return code or output parameters returned from the server component function into a response message. Additionally, the generated server-side code may also be configured to send the response message back to the client.

In some embodiments, the generated code may be configured to provide the server component with one or more functions that can be used to call call-back functions inside the client, if the API definition includes such functions (known as "handlers"). In some embodiments, for example to prevent certain types of denial-of-service attacks (whether intentional or accidental) by clients, handlers may be configured so that they are substantially inhibited from returning data, such as messages, back from the client to the server.

The invention will now be described with reference to specific examples. It will be understood that the following examples are intended to describe embodiments of the invention and are not intended to limit the invention in any way.

EXAMPLES

Example 1

FIG. 1 illustrates a collection of modular components 110a, 110b, 110c, 110d, 110e which are installed and coupled together to provide an application 115 which is operable on a wireless terminal. The components may be expressed via software and may represent programmed functionalities of the host wireless terminal. The application may, for example, function as an "app" which is operable on a given operating system.

Each modular component comprises software which, when executed, performs a predetermined set of operations. Each modular component further comprises a standardized interface 112a, 112b, 112c, 112d, 112e for interacting with other modular components. The interface may be used to pass input parameters for use in performing the predetermined set of operations of the component, and/or to pass output parameters which result from the predetermined set of operations. The interface is such that the different other components may interact with a given component through a common set of messages. The interface is further such that the given component may interact with different other components through the common set of messages.

The components may interact with specified other components by direct message passing between their respective standardized interfaces. Direct interaction is illustrated in FIG. 1 by lines connecting the various standardized interfaces 112a, 112b, 112c, 112d, 112e. Indirect interaction may be facilitated by relaying messages via the direct interactions. For example, a message may be relayed between components 110b and 110c via component 110a.

A supervisory module 110a is illustrated as one of the components. The supervisory module may manage operation of the application, interaction with the application, interaction of the components, updating of components, or the like, or a combination thereof. A supervisory module may or may not closely resemble other components, such as client and server components.

A directory 120 is illustrated. Examples of directories, such as service directories, are described elsewhere herein.

The application may be defined via a set of instructions which defines which components are to be used and how they are to be interconnected.

Figure 2:
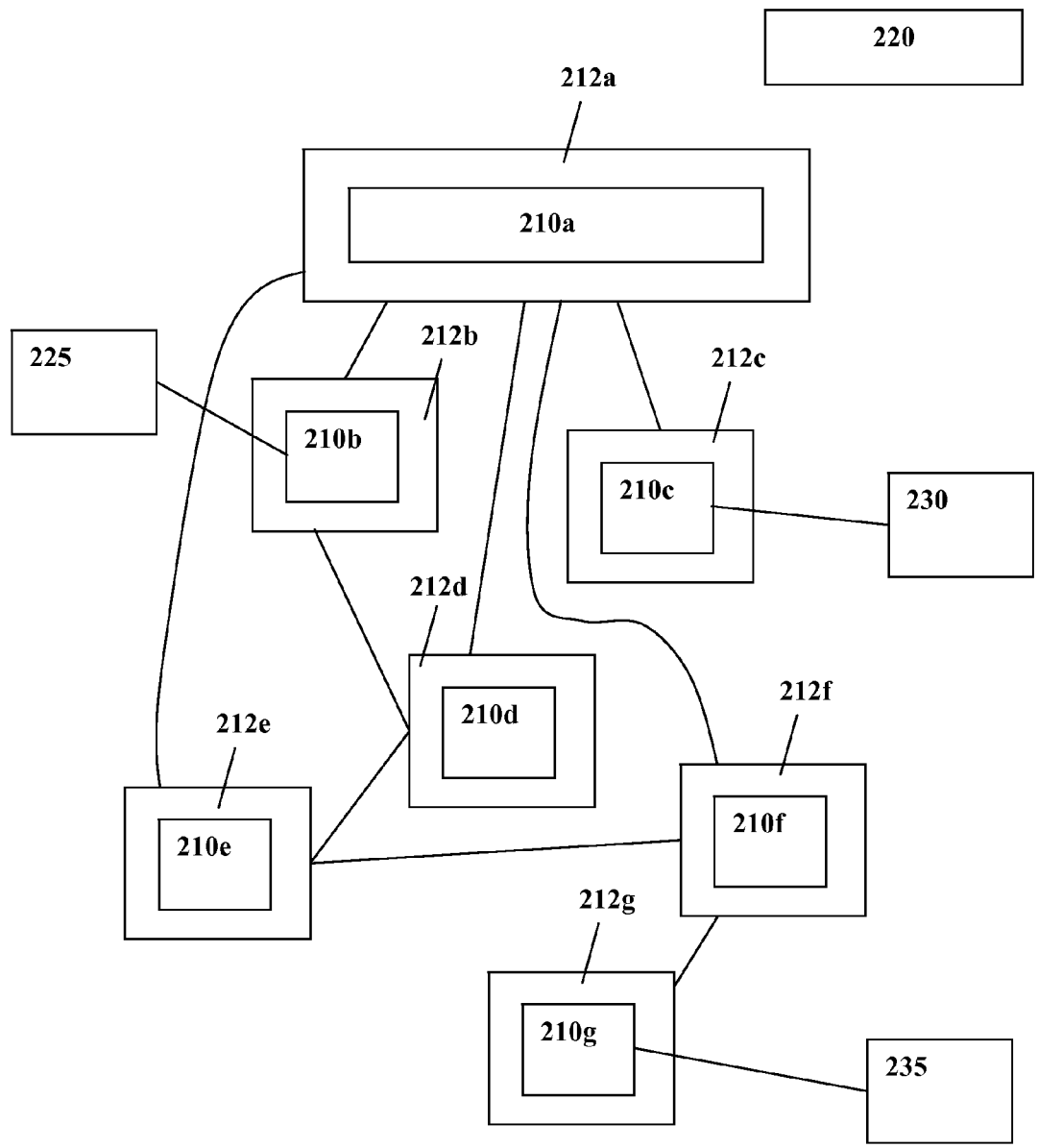
FIG. 2 illustrates a collection of modular applications, in accordance with embodiments of the invention.

In some embodiments, the application may also comprise a standardized interface 117 for interacting with other applications, as described elsewhere herein for example with respect to FIG. 2. In some embodiments, the interface 117 is coupled primarily or solely to the supervisory module 110a, which is configured to manage communication with other applications via the interface 117.

As illustrated, some or all components may interact with different hardware 125, 130 of the wireless terminal.

Example 2

FIG. 2 illustrates a collection of modular applications 210a, 210b, 210c, 210d, 210e, 210f, 210g such as "apps" which are operable on a given operating system of a wireless terminal. The modular applications automatically interact with each other via standardized interfaces 212a, 212b, 212c, 212d, 212e, 212f, 212g to provide a desired overall service or functionality of the wireless terminal. As above, a standardized interface may be used to pass input parameters for use in performing the predetermined set of operations of the application, and/or to pass output parameters which result from the predetermined set of operations. The interface is such that the different other applications may interact with a given application through a common set of messages. The interface is further such that the given application may interact with different other applications through the common set of messages.

In some embodiments, one or more of the modular applications illustrated in FIG. 2 may be formed of modular components as illustrated in FIG. 1.

A supervisory module 210a is illustrated. Examples of supervisory modules are described elsewhere herein. The supervisory module may be operatively coupled to at least some of the other modular applications and may manage operation of the application, interaction with the application, interaction of the components, updating of components, or the like, or a combination thereof A directory 220 is illustrated. Examples of directories, such as service directories, are described elsewhere herein. The directory may be configured to manage access to common components, for example.

As illustrated, some or all applications may interact with different hardware 225, 230, 235 of the wireless terminal. The hardware may correspond to sensors, sources of local telemetry data, GPS devices, or other electronic components which are associated with functionality of the wireless device or a device associated with the wireless device.

Example 3

Figure 3:
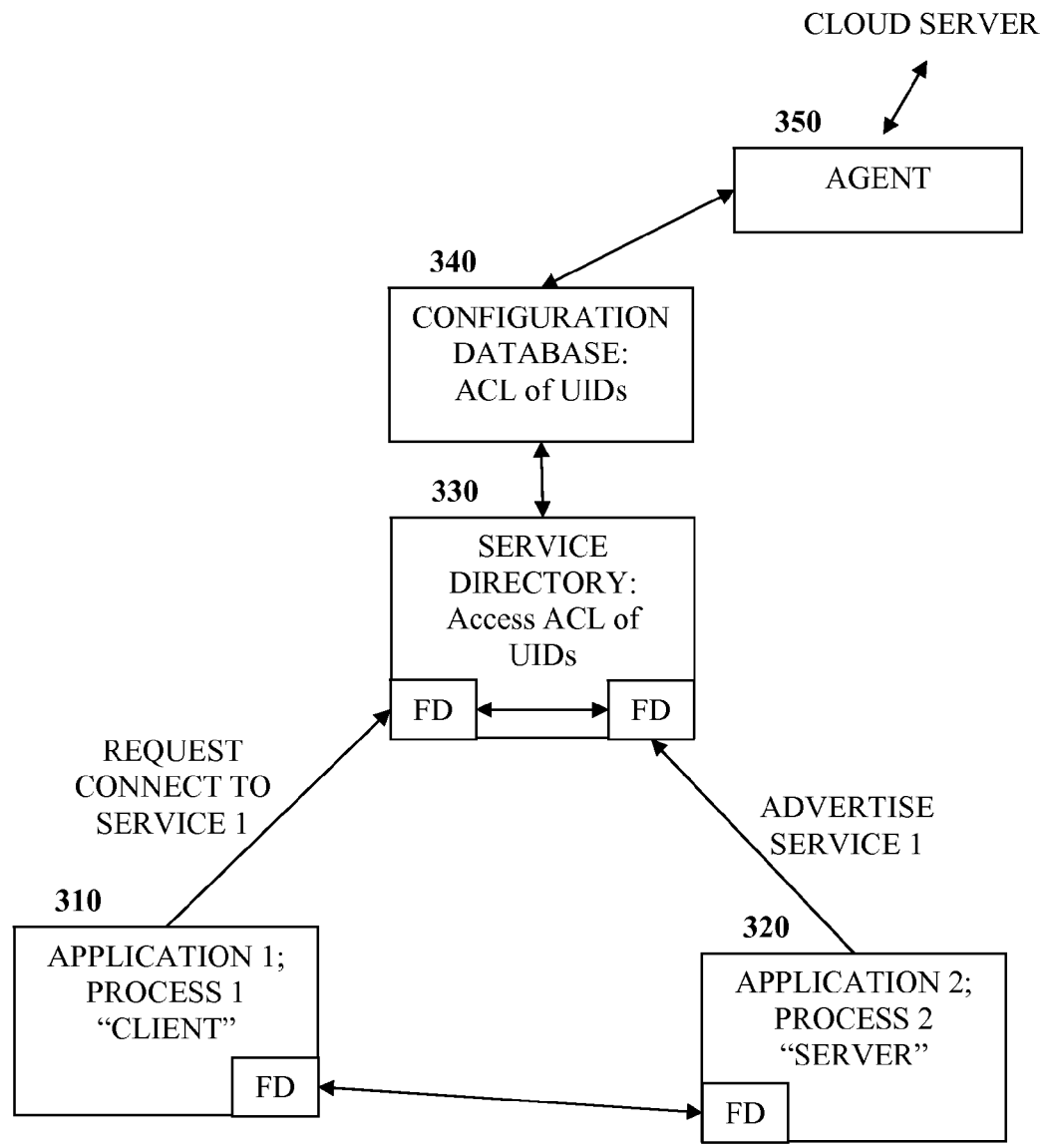
FIG. 3 illustrates the supervised connection of modular elements to each other, in accordance with embodiments of the invention.

FIG. 3 illustrates an example embodiment of the present invention comprising two applications 310 and 320, a service directory 330, a configuration database 340 and an optional agent 350. Additional applications may also be provided but are not shown for simplicity.

The supervisory module (not shown) starts each of the other parts; the service directory 330, the configuration database 340 and the applications 310 and 320. The supervisory module also creates a "sandbox" for each application 310 and 320. Applications have unique IDs. The supervisory module is further configured to create a Temporary File System (TMPFS), Random Access Memory File System (RAMFS), or other type of file system, with a defined size at the location of the sandbox. The supervisory module is further configured to bind mount the required files and processes and set resource limits. For example, as is known, the TMPFS is a Linux file system that is used because it does not increase in size dynamically. In contrast, RAMFS may grow dynamically. Bind mounting is an existing concept within operating systems such as Linux.

Connections between applications are managed by the service directory 330. All services that are available are listed in the configuration database. When an application wants to connect to another it first connects to the service directory 330. The service directory maintains information on which applications are permitted to connect to others. This may include practical compatibility and permissions based on payment of a subscription or a license. The service directory may be configured to inhibit connection unless and/or until the applications to be connected are compatible and available. This provision avoids the possible connection of applications that are not ready and not fully able to connect. In some embodiments, once connection is allowed, the connected applications may communicate directly.

The configuration database may be updated to add or remove information on available applications and permissions. This can be done via an agent to a server in the cloud such as the Sierra Wireless™ AirVantage™ service.

As discussed previously, the configuration database 340 may contain an access control list (ACL) of User IDs (UID), wherein each application 310, 320 has a Linux UID. These may not be UIDs that can login in the normal sense but they do uniquely identify each application. The service directory 330 has access to the ACL of UIDs and is configured to connect the applications 310, 320.

Referring to FIG. 3, Application 1 310 is configured to make a request to the service directory 330 to connect to a first service. Independently and possibly concurrently, Application 2 320 is configured to advertise the first service on the service directory 330. The service directory is configured to check the ACL on the first service and determine whether Application 1 has the required permission to access the first service. If so, the service directory connects Application 1 310 to Application 2 320. This may include connecting the two applications via a socket pair. This may additionally include sending file descriptors (FD) to each of these applications 310, 320. The file descriptor for Application 2 may be sent to Application 1 for use and/or the file descriptor for Application 1 may be sent to Application 2.

In some embodiments, to connect applications, for example to connect a client application to a server application, the service directory may be configured to pass a file descriptor (FD) to the server application. The client application may continue to use a FD which was originally created (e.g. by the client) when the client connected to the Service Directory. It is noted that, in some embodiments, because the server now has the FD that was created by the act of the client connecting to the service directory, the server may now ask the operating system, for example Linux OS, to provide it with an authenticated UID of the client that is connected via that FD. This is an alternative approach to creating the FD through a "socketpair( )" system call in the service directory. Different possibilities may be provided for in this approach.

In some embodiments, applications may involve multiple different processes, each of which may be configured to connect to multiple services, advertise services, or the like. In some embodiments, two or more processes of a given application may connect to services offered by one or more different applications.

Figure 4:
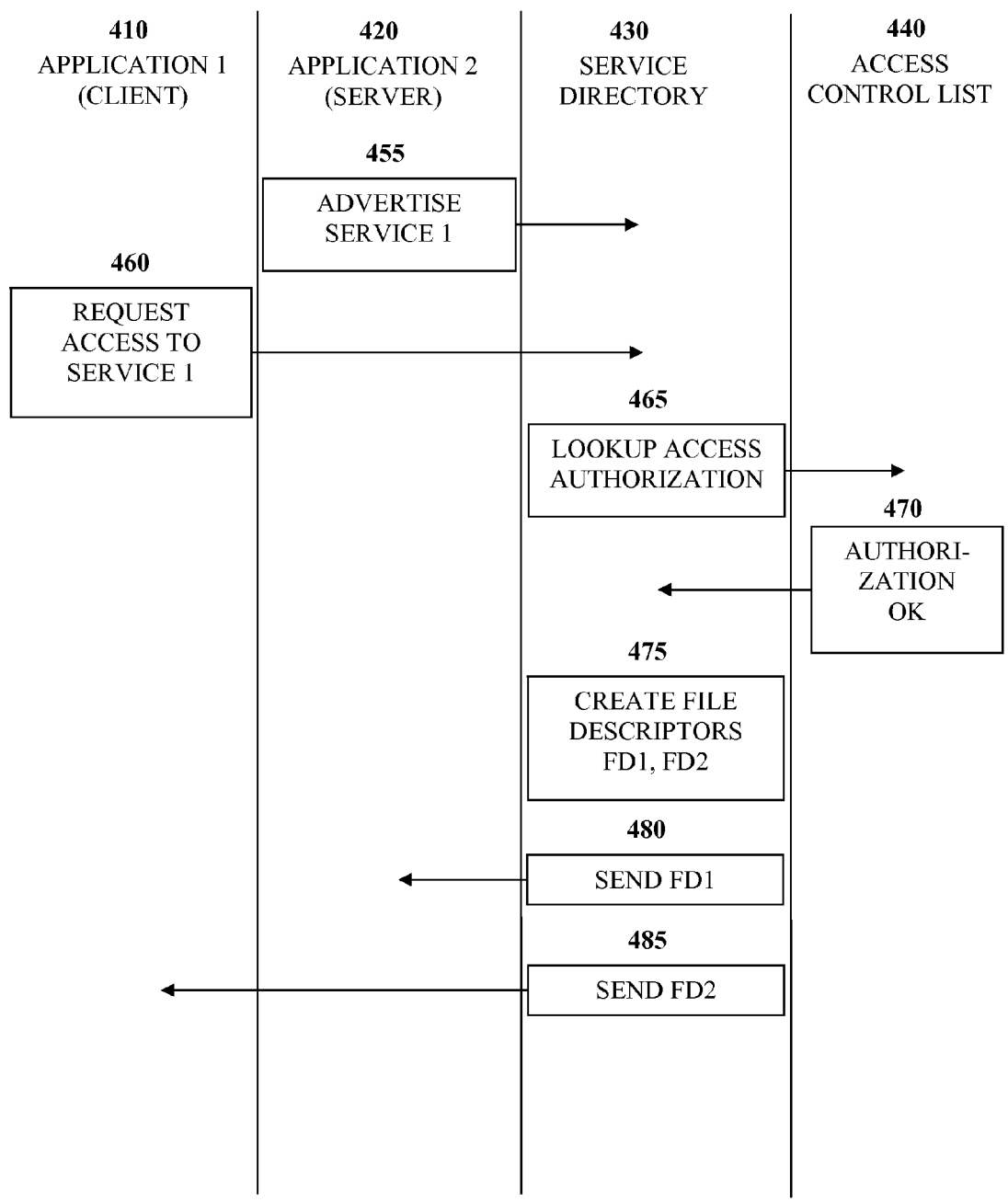
FIG. 4 illustrates a particular form of the supervised connection of modular element of FIG. 3, in accordance with some embodiments of the present invention

FIG. 4 illustrates further a particular form of the configuration of FIG. 3 in accordance with some embodiments of the present invention. A second application 420 advertises 455 a particular service to a service directory 430, and subsequently a first application 410 sends a request 460 to the service directory for that particular service. The service directory 430 performs a lookup operation 465 in an access control list (ACL) 440 to determine whether the first application 410 is authorized to access the particular service based on permission settings as described elsewhere herein. If an outcome 470 of the lookup operation indicates that the first application is authorized to access the service, then the service directory proceeds to connect the two applications directly.

In the presently illustrated embodiment, the service directory 430 may be configured to connect the first application 410 with the second application 420 by sending 480 a first one of a pair of file descriptors, denoted FD1, to the second application 420 and sending 485 a second one of a pair of file descriptors, denoted FD2, to the first application 410. The service directory may be configured to create 475 the pair of file descriptors prior to sending thereof. The file descriptors may be created in association with creation of a socket pair, for example, as would be readily understood by a worker skilled in the art.

Various embodiments of the present invention provide for a computing apparatus, such as a wireless terminal device, which is configured to operate as described herein. The computing apparatus may comprise one or more microprocessors operatively coupled to memory and configured to execute program instructions stored in said memory. The program instructions may cause the apparatus to operate as described herein. Additionally or alternatively, the apparatus may comprise firmware configured to cause the apparatus to operate as described herein. The apparatus may correspond to a particular M2M wireless terminal device which is configured as described herein through the use of software and/or firmware.

Figure 5:
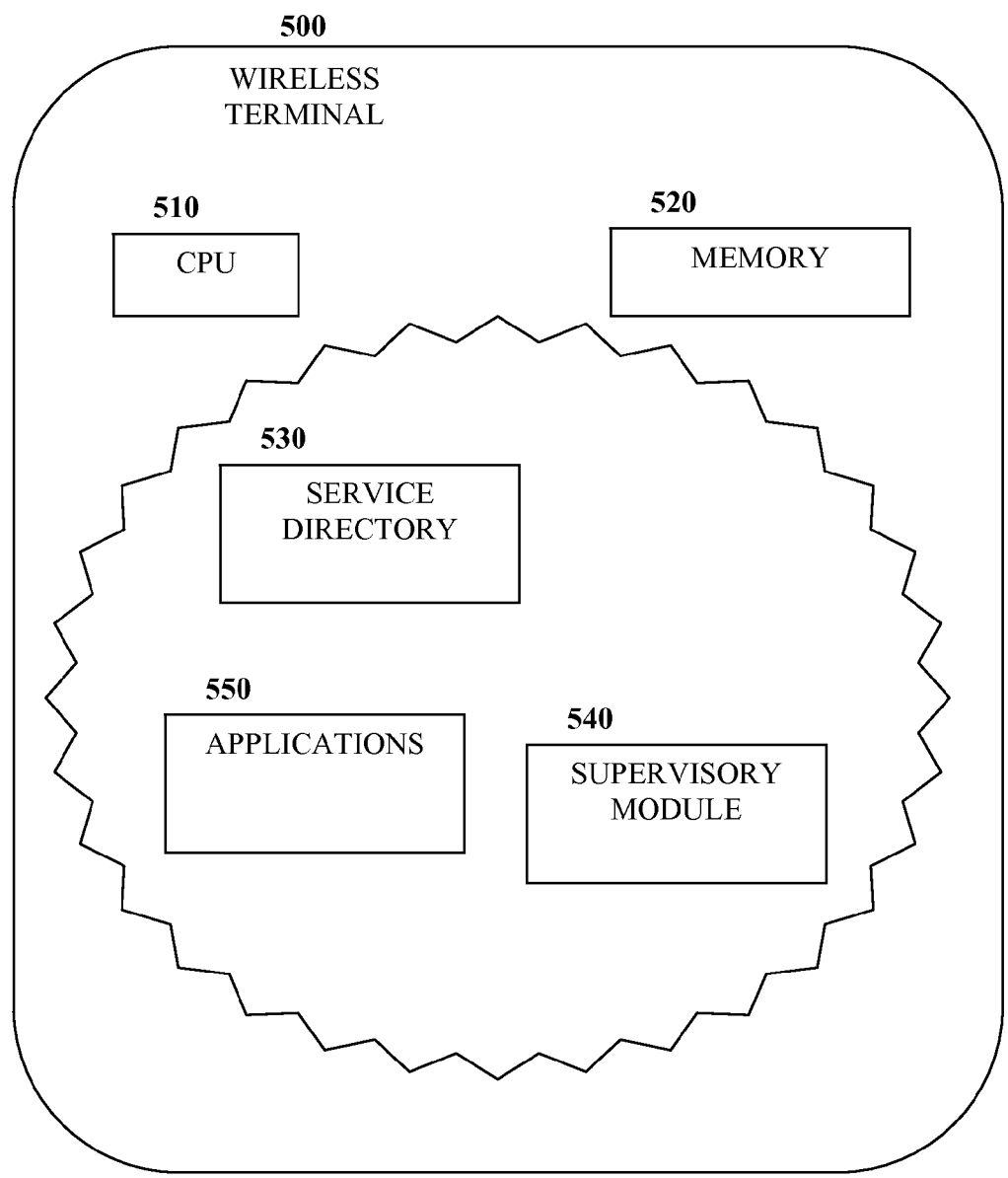
FIG. 5 illustrates an apparatus provided in accordance with embodiments of the invention.

FIG. 5 illustrates a wireless terminal computing apparatus 500 provided in accordance with an embodiment of the present invention. The apparatus comprises a processor 510 operatively coupled to a computer memory component 520. The memory comprises instructions for execution by the processor 510 in order to implement various functional aspects of the computing apparatus. These aspects include the service directory 530 and the supervisory module 540 as described elsewhere herein, along with various applications 550 which may be operatively coupled by way of the supervisory module 540.

In various embodiments, the wireless device configuration as described herein provides a solution by which device functionality may be improved. For example, by allowing direct communicative coupling of components through a standard interface, operating efficiency of the device may be improved. As another example, by providing a modular structure and component interface standardization, efficient reconfigurability of the device may be provided.

Embodiments of the present invention may provide for improved performance of a computer, for example by allowing for streamlined, direct interaction of modular aspects of the computer.

Although the preceding examples illustrate certain interfaces between components and hardware of the wireless terminal, it is noted that certain other interfaces between components and hardware may also be present but not necessarily illustrated. For example, each component inherently interfaces with hardware such as microprocessor, volatile, and non-volatile memory, and also indirectly with other components such as power supplies and other electronic components enabling operation of software loaded onto the wireless terminal. Further, applications and components may interface with the operating system in order to access resources provided natively to the operating system, such as scheduling, memory management, memory resources, device access, security, and the like.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Operations described herein, for example as method steps, may in various embodiments be implemented on a computing device, such as a wireless terminal, M2M terminal, or the like. In some embodiments, operations may be implemented cooperatively via a plurality of computing devices which are directly or indirectly communicatively coupled with each other. For example, a microprocessor may perform operations by executing program instructions stored in memory. Various embodiments of the present invention can be viewed as providing a means for improving the operation of such devices, by configuring computing operations thereof in an improved manner. This may, for example, improve aspects such as computational efficiency, power efficiency, deployment and reconfiguration of devices, and the like.

Acts associated with the method described herein can be implemented as coded instructions in a computer program product. In other words, the computer program product is a computer-readable medium upon which software code is recorded to execute the method when the computer program product is loaded into memory and executed on the microprocessor of an associated computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for facilitating operation of a wireless terminal device having plural code components installed thereon, the method comprising:
   a) providing, by the wireless terminal device, a directory for use by the plural code components installed on the wireless terminal device to advertise services offered by the plural code components and to request access by the plural code components to the advertised services;
   b) upon receiving a request for access by a first code component of the plural code components to a first advertised service of the advertised services, determining, by the wireless terminal device, whether the first code component is granted a permission to access the first advertised service; and
   c) upon determining that the first code component is granted the permission, directly communicatively coupling, by the wireless terminal device, the first code component to a second code component offering the first advertised service, the second code component belonging to the plural code components, wherein the first and second code components utilize a standardized communication interface for facilitating the direct communicative coupling,
   wherein determining whether the first code component is granted the permission to access the first advertised service comprises automatically determining whether the first code component and the second code component were generated using compatible API file versions, including a first hash value with the first code component and including a second hash value with the second code component, the first hash value generated from an API file used to generate the first code component, the second hash value generated from an API file used to generate the second code component, and
   wherein determining whether the first code component and the second code component were generated using compatible API file versions comprises comparing the first hash value with the second hash value.

2. The method of claim 1, wherein the first code component is written in a different programming language than the second code component.

3. The method of claim 1, wherein the first code component and the second code component form parts of a single program application.

4. The method of claim 1, wherein the first code component and the second code component correspond to two different interacting program applications.

5. The method of claim 1, wherein the first component is associated with a first sandbox environment and the second component is associated with a second sandbox environment separate from the first sandbox environment.

6. The method of claim 1, wherein the first component is associated with a first sandbox environment and the second component is associated with a second sandbox environment, and wherein the first sandbox environment is embedded within the second sandbox environment.

7. The method of claim 1, wherein at least one of the first component and the second component is associated with a sandbox environment, the method further comprising creating a file system as part of the sandbox environment, wherein the files system is a Temporary File System (TMPFS) or a Random Access Memory File System (RAMFS).

8. The method of claim 7, further comprising bind mounting a predetermined set of files within the file system, the predetermined set of files configured to support operation of the at least one of the first component and the second component.

9. The method of claim 1, wherein the first code component is associated with a first User ID and the second code component is associated with a second User ID, the method further comprising identifying the first code component using the first User ID and identifying the second code component using the second User ID.

10. The method of claim 1, wherein directly communicatively coupling the first code component to the second code component comprises creating a linked pair of file descriptors for facilitating message passing, and providing a first one of the pair of file descriptors to the first code component and providing a second one or the pair of file descriptors to the second code component.

11. A wireless terminal device, comprising:
   a) a memory having an operating system and plural code components installed thereon;
   b) a service directory installed in the memory for use by the plural code components installed on the wireless terminal device to advertise services offered by the plural code components and to request access to the advertised services; and
   c) a supervisory module installed in the memory and configured, upon receiving a request for access by a first code component of the plural code components to a first advertised service of the advertised services, to determine whether the first code component is granted a permission to access the first advertised service, the supervisory module further configured, upon determining that the first code component is granted the permission, to directly communicatively couple the first code component to a second code component offering the first advertised service, the second code component belonging to the plural code components, wherein the first and second code components utilize a standardized communication interface for facilitating the direct communicative coupling,
   wherein determining whether the first code component is granted the permission to access the first advertised service comprises automatically determining whether the first code component and the second code component were generated using compatible API file versions, including a first hash value with the first code component and including a second hash value with the second code component, the first hash value generated from an API file used to generate the first code component, the second hash value generated from an API file used to generate the second code component, and wherein determining whether the first code component and the second code component were generated using compatible API file versions comprises comparing the first hash value with the second hash value.

12. The wireless terminal device of claim 11, wherein the first code component is written in a different programming language than the second code component.

13. The wireless terminal device of claim 11, wherein the first code component and the second code component form parts of a single program application.

14. The wireless terminal device of claim 11, wherein the first code component and the second code component correspond to two different interacting program applications.

15. The wireless terminal device of claim 11, wherein the first component is associated with a first sandbox environment and the second component is associated with a second sandbox environment separate from the first sandbox environment.

16. The wireless terminal device of claim 11, wherein the first component is associated with a first sandbox environment and the second component is associated with a second sandbox environment, and wherein the first sandbox environment is embedded within the second sandbox environment or vice-versa.

17. The wireless terminal device of claim 11, wherein at least one of the first component and the second component is associated with a sandbox environment, the wireless terminal device further configured to create a file system as part of the sandbox environment, wherein the file system is a Temporary File System (TMPFS) or a Random Access Memory File System (RAMFS).

18. The wireless terminal device of claim 17, further comprising bind mounting a predetermined set of files within the file system, the predetermined set of files configured to support operation of the at least one of the first component and the second component.

19. The wireless terminal device of claim 11, wherein the first code component is associated with a first User ID and the second code component is associated with a second User ID, the wireless terminal device further configured to identify the first code component using the first User ID and to identify the second code component using the second User ID.

20. The wireless terminal device of claim 11, wherein directly communicatively coupling the first code component to the second code component comprises creating a linked pair of file descriptors for facilitating message passing, and providing a first one of the pair of file descriptors to the first code component and providing a second one or the pair of file descriptors to the second code component.

21. A computer program product comprising a non-transitory computer readable medium having stored thereon statements and instructions for execution by a computer for performing operations for facilitating operation of a wireless terminal device having plural code components installed thereon, the operations comprising:

a) providing, by the wireless terminal device, a directory for use by the plural code components installed on the wireless terminal device to advertise services offered by the plural code components and to request access by the plural code components to the advertised services;

b) upon receiving a request for access by a first code component of the plural code components to a first advertised service of the advertised services, determining, by the wireless terminal device, whether the first code component is granted a permission to access the first advertised service; and c) upon determining that the first code component is granted the permission, directly communicatively coupling, by the wireless terminal device, the first code component to a second code component offering the first advertised service, the second code component belonging to the plural code components, wherein the first and second code components utilize a standardized communication interface for facilitating the direct communicative coupling, wherein determining whether the first code component is granted the permission to access the first advertised service comprises automatically determining whether the first code component and the second code component were generated using compatible API file versions, including a first hash value with the first code component and including a second hash value with the second code component, the first hash value generated from an API file used to generate the first code component, the second hash value generated from an API file used to generate the second code component, and wherein determining whether the first code component and the second code component were generated using compatible API file versions comprises comparing the first hash value with the second hash value.

* * * * *